US012645776B2

(12) United States Patent
Nanda et al.

(10) Patent No.: US 12,645,776 B2
(45) Date of Patent: Jun. 2, 2026

(54) FOOL-PROOF REGISTRATION SYSTEM AND METHODS THEREOF

(71) Applicant: Jio Platforms Limited, Ahmedabad (IN)

(72) Inventors: Nanda Nandan Nanda, Bharak (IN); Amit Dube, Mumbai (IN); Abhiraj Singh Panwar, Indore (IN); Jitendra Bhatia, Mumbai (IN)

(73) Assignee: JIO PLATFORMS LIMITED, Ahmedabad (IN)

( * ) Notice: Subject to any disclaimer, the term of this patent is extended or adjusted under 35 U.S.C. 154(b) by 585 days.

(21) Appl. No.: 18/058,790

(22) Filed: Nov. 25, 2022

(65) Prior Publication Data

US 2023/0161854 A1     May 25, 2023

(30) Foreign Application Priority Data

Nov. 25, 2021     (IN) ............................. 202121054546

(51) Int. Cl.
*G06F 21/32*     (2013.01)
*G06V 40/16*     (2022.01)
(52) U.S. Cl.
CPC ............ *G06F 21/32* (2013.01); *G06V 40/168* (2022.01)
(58) Field of Classification Search
CPC .... G06F 21/32; G06V 40/168; G06V 40/172; G06V 40/50
See application file for complete search history.

(56) References Cited

U.S. PATENT DOCUMENTS

| | | | | |
|---|---|---|---|---|
| 7,698,322 | B1 * | 4/2010 | Langley ................. | G06Q 40/08 |
| | | | | 713/186 |
| 10,936,706 | B2 * | 3/2021 | Nowak ................... | G06F 21/32 |
| 2011/0320353 | A1 * | 12/2011 | Mehew ................... | G06F 21/32 |
| | | | | 705/44 |
| 2012/0331566 | A1 * | 12/2012 | Lection ................... | G06F 21/32 |
| | | | | 726/28 |
| 2019/0068594 | A1 * | 2/2019 | Sarwar .................... | G06F 21/32 |
| 2019/0243956 | A1 * | 8/2019 | Sheets ................... | G06F 16/903 |
| 2019/0332851 | A1 * | 10/2019 | Han ...................... | G06V 40/172 |
| 2022/0156485 | A1 * | 5/2022 | Tzvieli ................. | G06V 40/174 |
| 2022/0398406 | A1 * | 12/2022 | Lev ...................... | G06V 40/168 |
| 2024/0106823 | A1 * | 3/2024 | Ricchuiti ............ | H04L 63/0861 |
| 2024/0314121 | A1 * | 9/2024 | Chaudhry .............. | G06F 21/32 |

* cited by examiner

*Primary Examiner* — Juan M Guillermety
(74) *Attorney, Agent, or Firm* — FINNEGAN, HENDERSON, FARABOW, GARRETT & DUNNER, LLP

(57)     ABSTRACT

The present invention provides a robust and effective solution to an entity or an organization by enabling them to implement a system for providing a fool proof biometric registration and/or verification system. The system and method enables registration by selecting a certain set of images of a user, extracting variations of feature vectors and storing the set of images to represent the user in the recognition system database. The system providing a fool-proof system to register personnel across different locations maintaining consistency and quality of data collected.

12 Claims, 12 Drawing Sheets

300A

300B

400

500

600

REG BOOTH 1
602-1

RTSP VIA BACKEND 604

REG BOOTH 2
602-2

REG BOOTH N
602-N 610-1
POSE & FACE DETECTION 606 | BUSINESS LOGIC 608

REG INSTANCE 2
610-2

REG INSTANCE N
610-N

HTTP

POSE & GAZE ESTIMATION FOR DIFFERENT FACE ORIENTATION    614

FACE FV GENERATION    614

BATCHING

FEATURE VECTOR INSERTION
616

METADATA INSERTION
618

700

800

900

1000

1100

1200

FOOL-PROOF REGISTRATION SYSTEM AND METHODS THEREOF

FIELD OF INVENTION

The embodiments of the present disclosure generally relate to facilitating biometric enrolment for capturing biometric data, as well as biometric verification and registration. More particularly, the present disclosure relates to a system and method for facilitating a fool-proof biometric authentication of a user based on machine learning architecture.

BACKGROUND OF THE INVENTION

The following description of related art is intended to provide background information pertaining to the field of the disclosure. This section may include certain aspects of the art that may be related to various features of the present disclosure. However, it should be appreciated that this section be used only to enhance the understanding of the reader with respect to the present disclosure, and not as admissions of prior art.

The area of use is surveillance and security purposes, be it from Access Control using Face Recognition, Attendance capturing, or general security surveillance enabling smart camera support in any standard camera, thus enabling it to register faces in various deployment scenarios.

The accuracy of any Face Recognition System is directly affected by the quality and consistency of the data gathered for registration. Current industry practices focus on continuous training and improvement of Face Recognition models, with little focus on the Registration aspect of it. Users are registered either using smartphone selfies, or differently configured cameras with no unerring system in place to ensure the quality and consistency of the registration data, as well as the whole registration process, leading to inaccurate and inconsistent results during recognition.

There is, therefore, a need in the art to provide a system and a method for providing a fool-proof system to register personnel across different locations maintaining consistency and quality of data collected.

OBJECTS OF THE PRESENT DISCLOSURE

Some of the objects of the present disclosure, which at least one embodiment herein satisfies are as listed herein below.

It is an object of the present disclosure to provide a system and a method for facilitating enhanced registration system.

It is an object of the present disclosure to provide a system and a method that can enable Mask detection, Head pose estimation, Similarity search, Duplication check, Blacklist and Gaze Detection.

It is an object of the present disclosure to provide a system and a method provide a fool-proof biometric registration and/or verification system.

It is an object of the present disclosure to provide a system and a method for enabling a defined formal method for an accurate and consistent Face Registration system.

BRIEF DESCRIPTION OF DRAWINGS

The accompanying drawings, which are incorporated herein, and constitute a part of this invention, illustrate exemplary embodiments of the disclosed methods and systems in which like reference numerals refer to the same parts throughout the different drawings. Components in the drawings are not necessarily to scale, emphasis instead being placed upon clearly illustrating the principles of the present invention. Some drawings may indicate the components using block diagrams and may not represent the internal circuitry of each component. It will be appreciated by those skilled in the art that invention of such drawings includes the invention of electrical components, electronic components or circuitry commonly used to implement such components.

Figure 1:
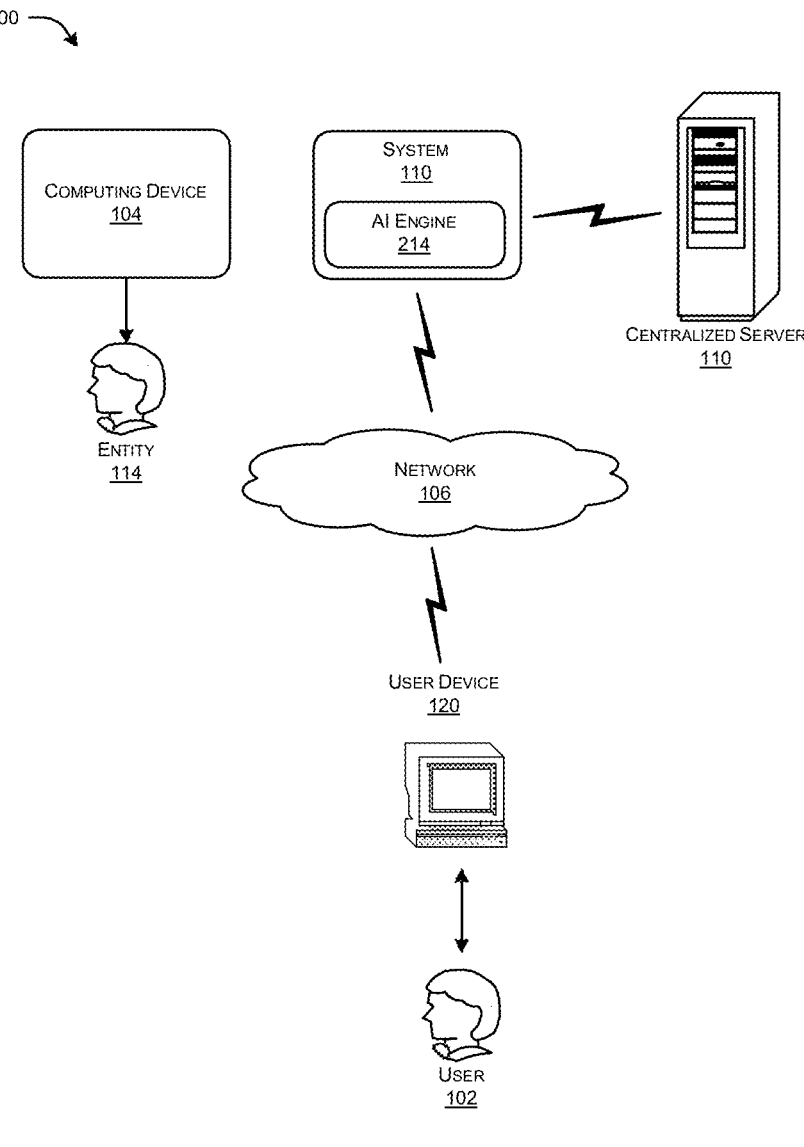
FIG. 1 illustrates an exemplary network architecture in which or with which the system of the present disclosure can be implemented, in accordance with an embodiment of the present disclosure.

The foregoing shall be more apparent from the following more detailed description of the invention.

BRIEF DESCRIPTION OF INVENTION

In the following description, for the purposes of explanation, various specific details are set forth in order to provide a thorough understanding of embodiments of the present disclosure. It will be apparent, however, that embodiments of the present disclosure may be practiced without these specific details. Several features described hereafter can each be used independently of one another or with any combination of other features. An individual feature may not address all of the problems discussed above or might address only some of the problems discussed above. Some of the problems discussed above might not be fully addressed by any of the features described herein.

The present invention provides a robust and effective solution to an entity or an organization by enabling them to implement a system for providing a fool proof biometric registration and/or verification system. The system and method enable registration by selecting a certain set of images of a user, extracting variations of feature vectors and storing the set of images to represent the user in the recognition system database. The system providing a fool-proof system to register personnel across different locations maintaining consistency and quality of data collected.

In an aspect, a fool-proof registration system (100) is disclosed. The system includes a centralized server (110) that is coupled with a processor over a network (106). The processor is configured to establish a communicative coupling between a computing device (104) of the entity (114) and the centralized server (114). The processor then receives a first set of data packets associated with the entity (114) that are measured by one or more sensors operatively coupled with the processor. Based on the received first set of data packets, the processor extracts one or more biometric features of the entity (114). The processor then retrieves from the centralized server (110) a second set of data packets responsive to receipt of the first set of data packets to compare the extracted biometric features of the entity (114) with the retrieved second set of data packets and establish recognition of an identity of a user (102) upon positive match of the extracted one or more biometric features of the entity (114) and the second set of data packets wherein said second set of data packets pertain to biometric feature metadata and a user device metadata of a user device (120) associated with a pre-existing user profile, said user-profile being stored on the centralized database. Further, register, the entity as a new user upon the centralized server upon a negative match of the extracted one or more biometric features of the entity (114) and the second set of data packets.

Referring to FIG. 1 that illustrates an exemplary network architecture (100) in which or with which system (110) of the present disclosure can be implemented, in accordance with an embodiment of the present disclosure. As illustrated in FIG. 1, by way of example but not limitation, the exemplary architecture (100) may include a user (102) associated with a user computing device (120) (also referred to as user device (120)), at least a network (106) and at least a centralized server (112). More specifically, the exemplary architecture (100) includes a system (110) equipped with a machine learning (ML) engine (216) for facilitating recognition and registration of the user (102) that can receive a first set of data packets that may include a video stream from the user computing device (120) or any biometric sensing devices. In an exemplary embodiment, the biometric sensing devices may include a scanning and extraction camera sensor but not limited to the like. The video stream may pertain to biometric features of the user (102). The system (110) may include a database (210) that may store a knowledgebase having a set of potential identity information associated with the biometric features of the user (102) and a plurality of information associated with the user (102). The user device (120) may be communicably coupled to the centralized server (112) through the network (106) to facilitate communication therewith. As an example, and not by way of limitation, network architecture (100) may include a second computing device (104) (also referred to as computing device hereinafter) associated with an entity (114). The computing device (104) may be operatively coupled to the centralised server (112) through the network (106).

In an embodiment, the system may be configured within the centralized server (112).

In an exemplary embodiment, the set of data packets may include all variations and diverse face profiles to maximize accuracy at the time of recognition, as opposed to image-based registration. Separate point multiple profiles such as left, right, front and the like may be captured. The system captures the face profiles of the user through a live video feed, following a pre-defined protocol.

In an embodiment, the system (110)/centralised server (112) may include a feature extraction engine (214). The feature extraction engine (214) may be operatively coupled to a biometric collection engine. The feature extraction engine may be configured to extract a first set of features from the received first set of data packets, where the first set of features may be associated with biometric features of the user. The first set of features may pertain to face detection and crop size, mask/face accessory detection, head pose estimation, roll angle, gaze detection and the like.

For example, the size of the face captured should be appropriate. Too small a face can lead to decreased recognition accuracy. Therefore, it must be ensured that the captured face size is greater than a prescribed minimum face size. At any particular time during the live capture, it is assumed that the biggest face captured is of the person to be registered. Even if this is not ensured, a fail-safe is by which an automatic selection of appropriate distance of human face from the camera, the system picks up the image.

Alternatively, while registration, concerned personnel should/should not be wearing mask, depending on the recognition solution. Similarly, goggles, hats and other accessories are also detected by this component of Fool-Proof Registration, and alert is raised for removal of the same.

In an embodiment, on a first communicative coupling of the user device (120) with the centralized server (110), the user profile corresponding to the user (102) is generated by the centralized server (110) based on user biometric feature metadata and the user device metadata based on one or more parameters input by the user.

In another embodiment, the user biometric features are recorded and stored onto the centralized server (110) for comparing with the received first set of data packets and identification of the entity (114) with the corresponding pre-stored user.

In yet another embodiment, the one or more sensors that generate the first set of data packets are any or a combination of a image capturing sensor, a biometric capturing sensor, a fingerprint sensor, an iris recognition sensor, a speech recognition sensor, a gesture recognition sensor, a scanner.

In yet another embodiment, the extraction of the biometric features of the entity (114) further includes any or a combination of face detection, mask/face accessory detection, head pose estimation, roll angle, gaze detection. In an embodiment, the first set of data packets is a video-stream captured by a camera.

In an embodiment, a plurality of cameras for capturing images are onboarded and communicatively coupled with a network file sharing server, said network file sharing server storing camera orientation information to enable capturing multiple view-profiles of the entity selected from any or a combination of left, right, front and back of the entity.

In an embodiment, the processor is further configured to: identify the entity (114) as the user (102) based on matching computing device metadata with the pre-stored user device metadata.

Additionally, the head pose estimation plays a key role in capturing the multiple face profiles, in the right ratio. For each frame, the Euler angles (Yaw, Pitch, Roll) for the person's face are computed. The x-angle (also called pitch), that symbolizes the face's rotation along the x (horizontal) axis, should be in the suitable range for proper registration, say −15 to +15 degrees. Same goes for the roll angle. As for Yaw, it signifies the real-case scenario of side profiles observed during recognition. Thus, we use the Yaw angle to capture frontal, left and right profiles of the face to be registered. Gaze signifies the direction of view of the concerned person's eye. For the same Head Pose, the gaze can be all round 360 degrees. While registering, we want the gaze to be frontal so as to maximize the capture of iris features.

In an exemplary embodiment, for the video based registration, superior quality at least 12 images from a pool of over 200 images captured during registration process.

In an embodiment, the ML engine 216 may be then configured to map any or a combination of extracted first set of features with the knowledgebase to recognise and register the user.

In an embodiment, the system (110)/server (112) may further configure the ML engine (216) to generate, through an appropriately selected machine learning (ML) model of the system in a way of example and not as limitation, a trained model configured to process the identified and registered user, and predict, from the plurality of services, an information service associated with the recognised and registered user, and facilitate response corresponding to the information service to the recognised and registered user based on the trained model. The ML engine (216) may be further configured to auto-generate the response by the system to the recognised and registered user.

In an embodiment, the system may be configured to obtain a registration data based on a request from an unregistered user through respective user device (120). In an exemplary embodiment, the login credentials may be generated based on acknowledgement of the request and verification of the registration data. In another exemplary embodiment, the user (102) may enter the generated login credentials to access the system to obtain the information service associated with the user (102).

In yet another embodiment, the system (110) may store consent of the user to store biometric features of the user (102) and upon receipt of the consent of the user the system (110) may store the biometric features of the user. In another embodiment, the biometric features may be stored based on the biometric scanners available in the user computing device (120) associated with the user (102).

In another embodiment, the ML engine (216) may monitor continuous and cumulative failure counts that ensures the process may be terminated if registration is not concluded in a pre-determined maximum duration. For example, when a face of the user is not being detected since the start of registration till say 2000 frames the process terminates automatically. Similarly, if the cumulative count of frames where no face of the user has been saying reaches 5000 frames the process is then terminated automatically.

In yet another embodiment, the ML engine (216) may monitor deduplication such that when registering a user, the system may ensure that no user is registered twice with different employee details.

In another embodiment, the ML engine (216) may monitor similarity that may ensure that while registering all the images received to the system are of a single user and that no two people can be registered under a single identity.

In yet another embodiment, the ML engine (216) may blacklist a user. This feature may be used to register one or more users who need to be monitored or aren't allowed in the premises of the entity. A different database may be maintained for blacklisted users since the image quality received won't always be good for the blacklisted users.

In another embodiment, the ML engine (216) may be configured to perform a final quality check such that at any particular time during a live capture, it is assumed that the biggest face captured is of the user to be registered. If this is not ensured, a fail-safe is incorporated. It includes ensuring all the registration images may be clear and not blurry, include the same user (Similarity) and ensures quality.

In an exemplary embodiment, a self-check FR assurance may be performed to validate correct registration to close the registration process. For example, the user may validate himself by coming in-front of a self-check recognition booth and verify himself. In case employee credentials are not correct or face is not getting recognized, he will have to register again. The self-check assurance module may include the following Post Registration—the user comes in front of Self-Check FR Camera The user stands on the yellow mark on the floor The user gets his Name on the screen If the user is not getting right identification, he needs to raise compliant and re-register.

The system (110) of the present disclosure can enable entity (114) to customize the pre-defined responses in a manner that may best suit the needs of the entity (114) for enhanced awareness of the informational services offered by them. In an embodiment, the pre-defined responses as video streams (input) and the automated responses (output) may include any or a combination of responsive video frames and visual display of information including, but not limited to, graphical data and images that may be informative with respect to the pre-defined query. In an exemplary embodiment, the responsive video frames may be video recording that may be manually recorded using a recording device coupled to the computing device (104) of the entity (114). The recording device can be any or a combination of a camera, a video recorder and the like that may be either inbuilt or externally connected to the computing device (104) of the entity (102). The recording device may further include one or more audio recording accessories connected thereto. In an embodiment, the manual recording may be done based on an registration of an identity of the entity or one or more operators associated with the entity (102), such that only if the authentication may be positive, the entity or the operator may be allowed to manually record the responsive video frames. Based on positive authentication, the computing device (104) may be communicably coupled via an interface of the system (110) such that the system (110) may receive the pre-defined visual responses through an interface of the system (110).

In accordance with an embodiment and as illustrated in FIG. 1, on the user end, the architecture can enable the user gain access to the system only when he/she has been recognised and registered by the system. In an embodiment, the user may include, but not limited to, an existing employee, a potential employee, a research analyst, or any other person associated with the entity.

In an embodiment, the computing device (104) and/or the user device (120) may communicate with the system (110) via set of executable instructions residing on any operating system, including but not limited to, Android™, iOS™, Kai OS™ and the like. In an embodiment, computing device (104) and/or the user device (120) may include, but not limited to, any electrical, electronic, electro-mechanical or an equipment or a combination of one or more of the above devices such as mobile phone, smartphone, virtual reality (VR) devices, augmented reality (AR) devices, laptop, a general-purpose computer, desktop, personal digital assistant, tablet computer, mainframe computer, or any other computing device, wherein the computing device may include one or more in-built or externally coupled accessories including, but not limited to, a visual aid device such as camera, audio aid, a microphone, a keyboard, input devices for receiving input from a user such as touch pad, touch enabled screen, electronic pen and the like. It may be appreciated that the computing device (104) and/or the user device (120) may not be restricted to the mentioned devices and various other devices may be used. A smart computing device may be one of the appropriate systems for storing data and other private/sensitive information.

In an exemplary embodiment, a network 106 may include, by way of example but not limitation, at least a portion of one or more networks having one or more nodes that transmit, receive, forward, generate, buffer, store, route, switch, process, or a combination thereof, etc. one or more messages, packets, signals, waves, voltage or current levels, some combination thereof, or so forth. A network may include, by way of example but not limitation, one or more of: a wireless network, a wired network, an internet, an intranet, a public network, a private network, a packet-switched network, a circuit-switched network, an ad hoc network, an infrastructure network, a public-switched telephone network (PSTN), a cable network, a cellular network, a satellite network, a fiber optic network, some combination thereof.

In another exemplary embodiment, the centralized server (112) may include or comprise, by way of example but not limitation, one or more of: a stand-alone server, a server blade, a server rack, a bank of servers, a server farm, hardware supporting a part of a cloud service or system, a home server, hardware running a virtualized server, one or more processors executing code to function as a server, one or more machines performing server-side functionality as described herein, at least a portion of any of the above, some combination thereof.

Figure 2:
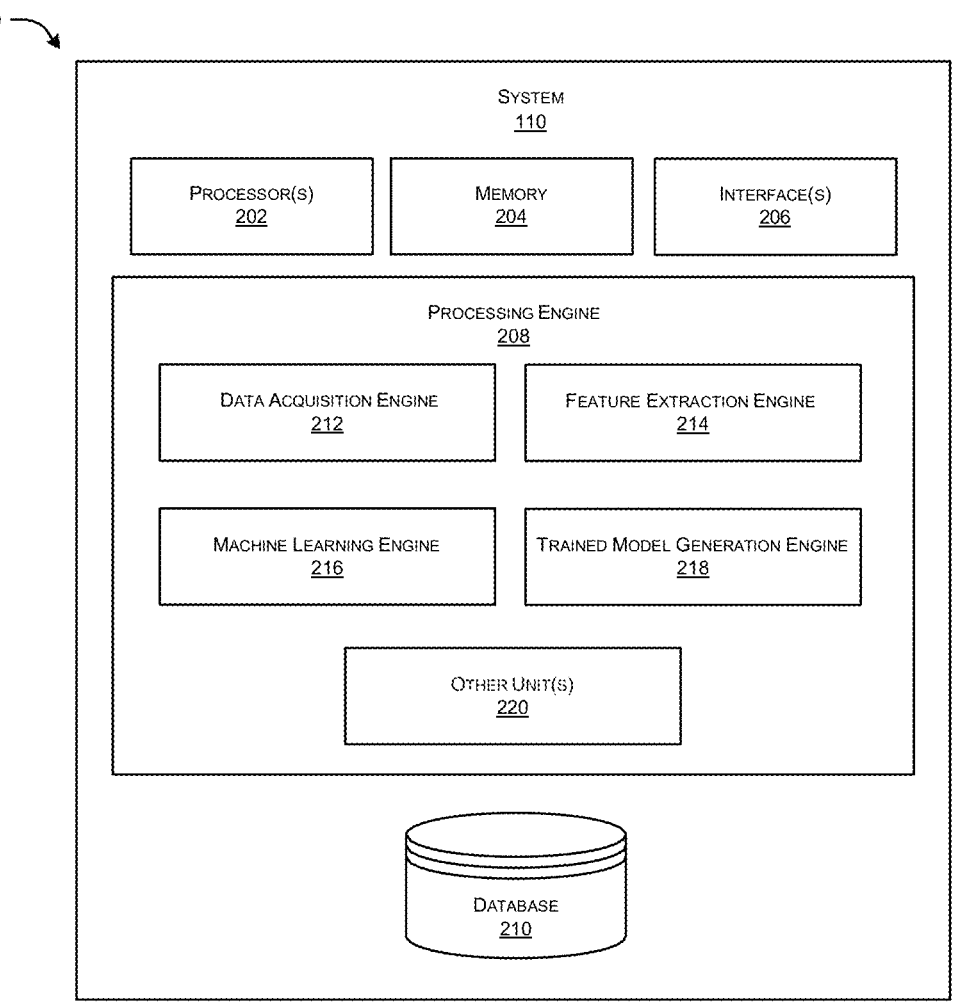
FIG. 2 illustrates an exemplary representation (200) of system (110) or a centralized server (112), in accordance with an embodiment of the present disclosure.

In an embodiment, the system (110) may include one or more processors coupled with a memory, wherein the memory may store instructions which when executed by the one or more processors may cause the system to perform the generation of automated visual responses to a query. FIG. 2 with reference to FIG. 1, illustrates an exemplary representation of system (110)/centralized server (112) for facilitating registration of a user are transmitted based on a machine learning based architecture, in accordance with an embodiment of the present disclosure. In an aspect, the system (110)/centralized server (112) may comprise one or more processor(s) (202). The one or more processor(s) (202) may be implemented as one or more microprocessors, microcomputers, microcontrollers, digital signal processors, central processing units, logic circuitries, and/or any devices that process data based on operational instructions. Among other capabilities, the one or more processor(s) (202) may be configured to fetch and execute computer-readable instructions stored in a memory (206) of the system (110). The memory (204) may be configured to store one or more computer-readable instructions or routines in a non-transitory computer readable storage medium, which may be fetched and executed to create or share data packets over a network service. The memory (204) may comprise any non-transitory storage device including, for example, volatile memory such as RAM, or non-volatile memory such as EPROM, flash memory, and the like.

In an embodiment, the system (110)/centralized server (112) may include an interface(s) 204. The interface(s) 206 may comprise a variety of interfaces, for example, interfaces for data input and output devices, referred to as I/O devices, storage devices, and the like. The interface(s) 204 may facilitate communication of the system (110). The interface(s) 206 may also provide a communication pathway for one or more components of the system (110) or the centralized server (112). Examples of such components include, but are not limited to, processing engine(s) 208 and a database 210.

The processing engine(s) (208) may be implemented as a combination of hardware and programming (for example, programmable instructions) to implement one or more functionalities of the processing engine(s) (208). In examples described herein, such combinations of hardware and programming may be implemented in several different ways. For example, the programming for the processing engine(s) (208) may be processor executable instructions stored on a non-transitory machine-readable storage medium and the hardware for the processing engine(s) (208) may comprise a processing resource (for example, one or more processors), to execute such instructions. In the present examples, the machine-readable storage medium may store instructions that, when executed by the processing resource, implement the processing engine(s) (208). In such examples, the system (110)/centralized server (112) may comprise the machine-readable storage medium storing the instructions and the processing resource to execute the instructions, or the machine-readable storage medium may be separate but accessible to the system (110)/centralized server (112) and the processing resource. In other examples, the processing engine(s) (208) may be implemented by electronic circuitry.

The processing engine (208) may include one or more engines selected from any of a data acquisition (212), a feature extraction (214), a machine learning (ML) engine (216), and other engines (218).

In an aspect, a method for fool-proof registration and identification is disclosed. The method comprises receiving by a data acquisition engine (212), a first set of data packets associated with an entity (114), said first set of data packets being measured by one or more sensors operatively coupled with the processor. The method then includes extracting by a feature extraction engine (214), from the received first set of data packets one or more biometric features of the entity (114). After extraction of the biometric features, the method includes retrieving from the centralized server (110) a second set of data packets responsive to receipt of the first set of data packets and comparing the extracted biometric features of the entity (114) with the retrieved second set of data packets. Based on the comparison, identifying upon positive match of the extracted one or more biometric features of the entity (114) and the second set of data packets an identity of a user (102).

In an embodiment, the second set of data packets pertain to biometric feature metadata and a user device metadata of a user device (120) associated with a pre-existing user profile, said user-profile being stored on the centralized database.

In an embodiment, the method further comprising conducting a duplication check based on the extracted one or more biometric features of the entity (114) and the second set of data packets.

In an embodiment, the step of receiving the first set of data packets includes inputting (402) by an image capturing device, a plurality of images of the entity, detecting (404) by the machine learning engine (216), a face of the entity. Based on the detected face, checking (408) by the ML engine (216), a dimension of the captured image with reference to a pre-defined threshold image size. Furthermore, the ML engine is configured to detecting a mask (416) upon the face within the captured image of the entity and estimating (420) a head pose of the entity based on the captured images.

Figure 3A:
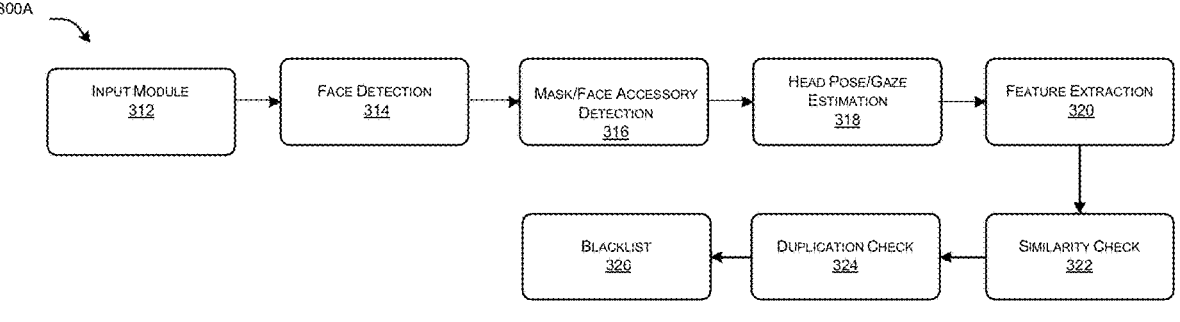
FIGS. 3A and 3B illustrate exemplary block diagrams representing registration and verification process of a user, in accordance with an embodiment of the present disclosure.
Figure 3B:
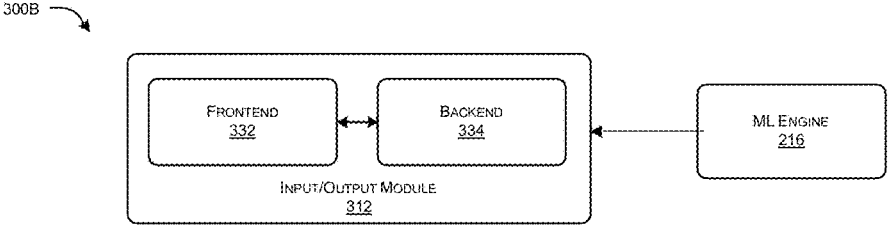

FIGS. 3A and 3B illustrate exemplary block diagrams representing registration and verification process of a user, in accordance with an embodiment of the present disclosure. As illustrated, FIG. 3A shows a plurality of functional components associated with the ML engine (216). The first sub module, is an input module (312) may be configured to take care of capturing suitable images for face feature vector. A face detection module (314) may be configured to input-input frame extracted from live video and provides output-face crops. It is responsible to detect all the face crops in a single raw frame and extract the biggest face crop for further processing. It also checks the stream accessible or not and raises alert to system in case stream is not accessible or no face is detected within specific period of times. A mask verification (316) may be configured to accept input as a biggest face crop and output as in terms of whether the user is wearing a mask or not (True/False). Once a face crop is detected successfully it is passed as input to mask detection model which properly discriminate among user with mask, user without mask, user with dense beard. If user is wearing mask the system prompts user to remove it on real time basis so that registration process will move on smoothly. A head pose estimation module (318) may be configured to receive an input which may be a biggest face crop and produce Euler angles for the face as an output. Since face recognition accuracy is dependent on different pose and variation of enrolled face of user, system should be intelligent enough to capture different variation of faces. Head pose estimation captures different poses of human face for example looking left 15 degrees or looking right 15 degrees or looking directly to camera. In this way system ensures the pose variation is not extreme so that it is not going to lose important features. The head Pose estimation module (318) and the mask detection module (316) may ensure it by capturing proper angle and clean face crop. Once a face bounding box is captured by face detection model the selection of face crop process starts using different functionality. Image scaling and normalization is the standard process system follows to make the detection prediction efficient.

A feature extraction (318) module takes the processed face crop as input and provides feature vectors using face recognition models as output. After passing all the above constraints, the images may be passed to recognition model. The Recognition model takes the images and extracts features like nose, eyes, lips, and the like. Using this features, it generates a mathematical representation of the face. This mathematical representation is an array of N dimension which can then be stored to database or do other recognition activity such as similarity or duplication check.

A similarity check module (320) may receive face crop images as input and Boolean output corresponding to the faces being similar or not.

In a way of example and not as a limitation, while registering a user, N number of images are captured for getting variations in the face with different orientation (center, left, right). The images are then matched within the same orientation i.e. matching center images captured with center images and so on. Within the same orientation if the images are all below a certain threshold, we accept the images within the orientation to be the same, if an image is not below the threshold, it is swapped out by the extra image. Similarity check within the orientation also ensures if the captured images are not blurred. There can be instances where images capture might be blurred hence this feature eliminates blur images. After Similarity check is done within the same orientation of images, images of different orientation are compared with each other. This check ensures that a single user is registered. There may be a case where a different user face gets captured for a single orientation hence this check ensures only a single user is registered throughout the registration process.

A duplication check module (324) may receive face crop images as input and a Boolean output corresponding to whether duplicate face or not. When registering a user, it is necessary that the user is registered only once with a single unique ID. The system ensures that a single unique face is registered only once for an organization with a unique ID. Hence a registered user cannot be registered twice with. When a user's image gets captured, it goes through feature extraction and similarity check, after passing the above checks the system checks user's face detail in the existing database if no match is found user is registered else registration exits. In an exemplary module, a Blacklist module (326) may receive images/video stream as input Register the user to blacklist database. This feature is used to register users who are under surveillance. The users who are to be blacklisted can be registered using single images, hence blacklisted users are registered in different databases. This is done to ensure accuracy of the system does not drop due to difference in registration data per person between whitelist and blacklist user.

Second sub module focuses on feature extraction and validate the features to be stored or duplicate or to be rejected. As illustrated in FIG. 3B, the input module (302) may include a frontend module (332) and a backend module (334) coupled to the ML engine (216). The frontend module (332) may include the following key functionalities On boarding camera for access control.

Employee id specific details is captured and sent from frontend by the operator.

Registration specific stage progress, success or failure with proper reason is sent back to the user.

Analysis of registered, failed user data and registration images.

The backend module (334) may include the following key functionalities Validating user data with central DB.

Validating if the user is already registered from employee ID.

Create a bridge for real time communication for frontend and backend for each registration process.

Prevent concurrent registration from same camera across location.

Communicate with ML engine for registration progress & data exchange like user details, health monitoring etc.

Figure 4:
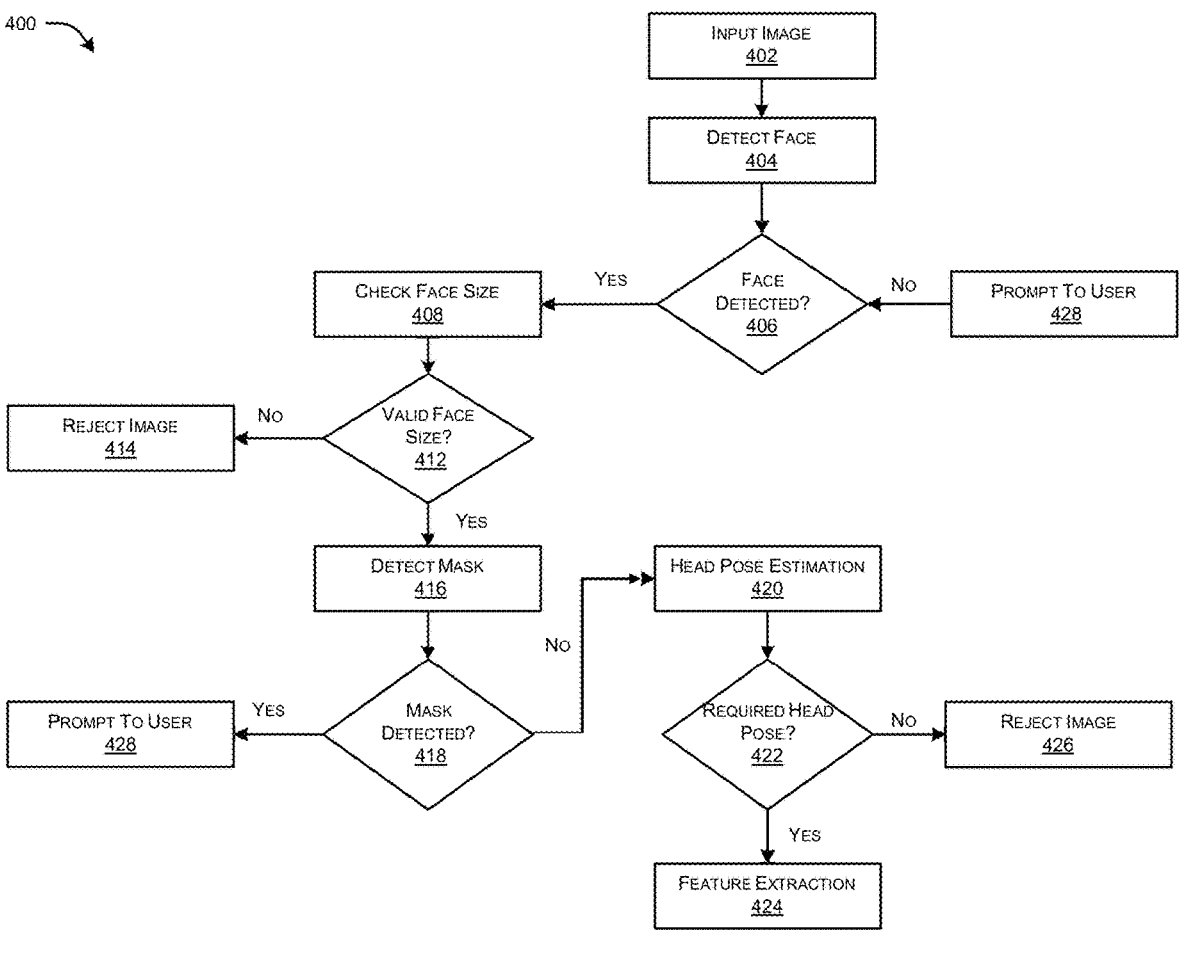
FIG. 4 illustrates an exemplary representation (400) of flow diagram associated with image capture and its implementation, in accordance with an embodiment of the present disclosure.

FIG. 4 illustrates an exemplary representation (400) of flow diagram associated with image capture and its implementation, in accordance with an embodiment of the present disclosure. As illustrated, the flow diagram (400) may include an input image (402) from which face is detected (404) and then check for face size (408). If face is not detected at (406), the user may be prompted (410). If a valid face size (412) is received then check detection of mask (416) else the image is rejected (414). If mask is detected (418) then prompt the user again (428). If mask is not detected (418), then head post estimation (420) is performed. If a required head pose estimation (422) is obtained, then features are extracted from the image (424) otherwise the image is rejected (426).

Figure 5:
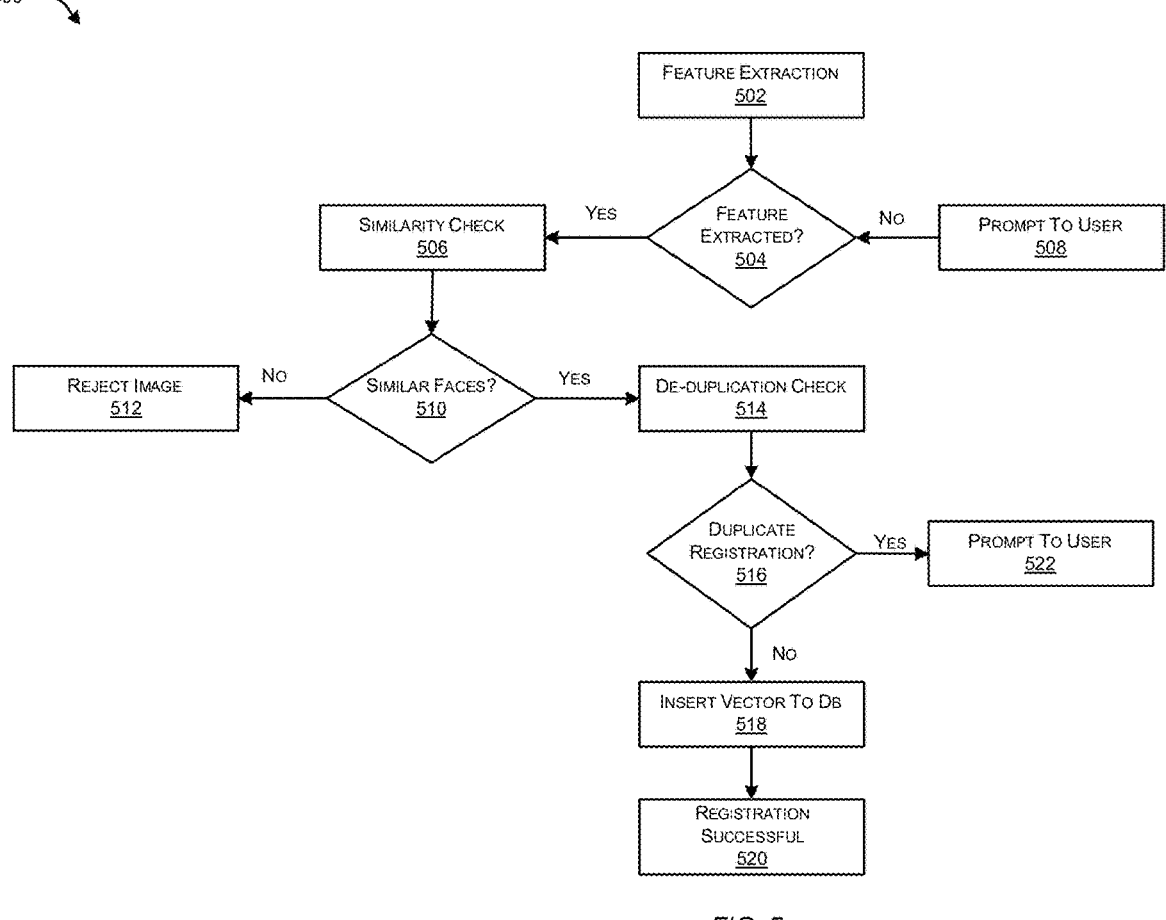
FIG. 5 illustrates an exemplary representation (500) of flow diagram associated with feature extraction and its implementation, in accordance with an embodiment of the present disclosure.

FIG. 5 illustrates an exemplary representation (400) of flow diagram associated with feature extraction and its implementation, in accordance with an embodiment of the present disclosure. As illustrated, the flow diagram (500) may include feature extraction (502) after which similarity check is done. If features are not extracted (506), the user is prompted (508). On similarity check, if similar faces are obtained (510), then perform de-duplication check (514) or else reject the image (512). If duplication registration is received, then prompt to the user. If duplication registration (516) is not received, then insert vector to database (518) and successfully complete the registration process (520).

Figure 6:
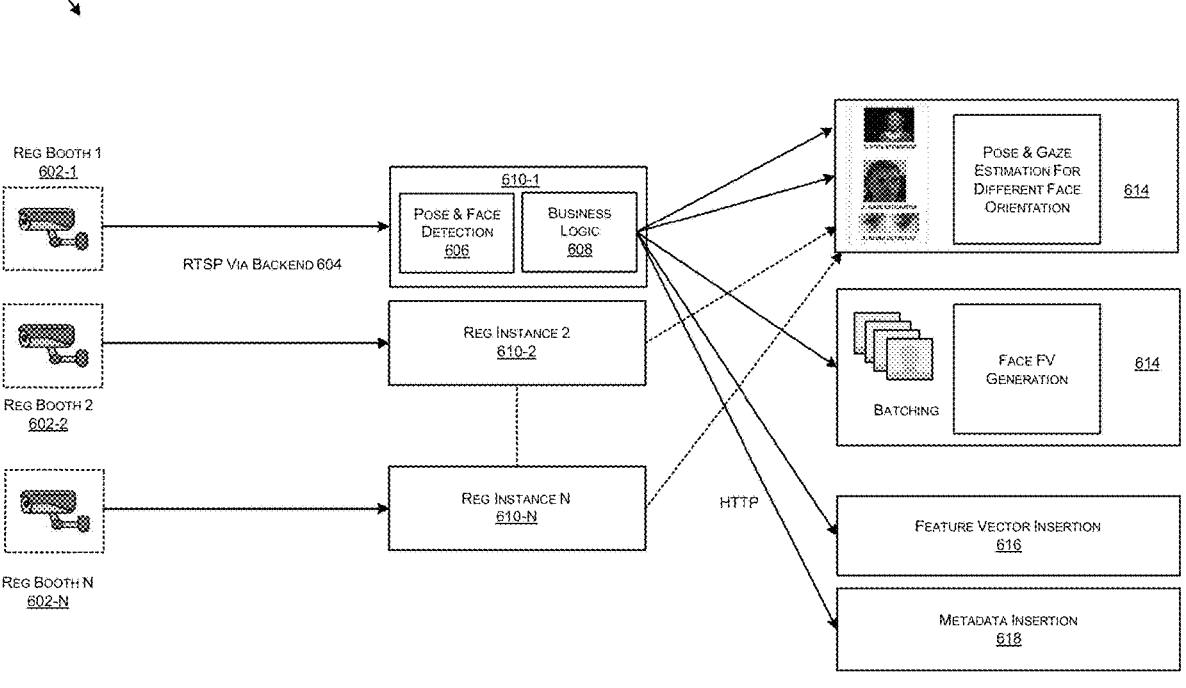
FIG. 6 illustrates exemplary block diagram representation of Registration Service AI Components (600), in accordance with an embodiment of the present disclosure.

FIG. 6 illustrates exemplary block diagram representation of Registration Service AI Components, in accordance with an embodiment of the present disclosure. As illustrated, N number of instances (602-1, 602-2 . . . 602-N) can simultaneously register users to the Global and Organization Specific datasets. The N number of instance are processed through N registration instances (610-1, 610-2 . . . 610-N), each comprising pose and face detection module (606) and logical module (608) that may be further coupled to pose and gaze estimation module (612), face FV generation module (614), Feature vector insertion module (616) and metadata insertion module (618).

Figure 7:
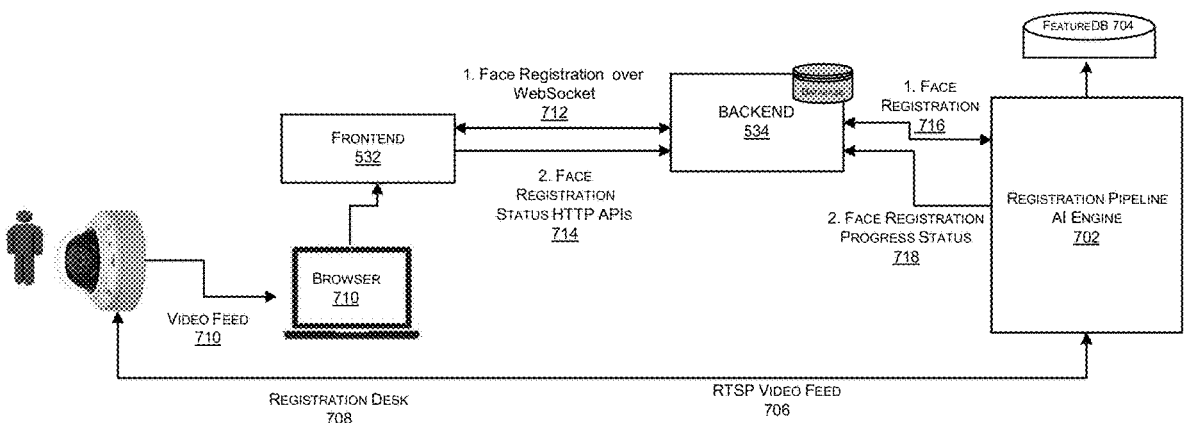
FIG. 7 illustrates exemplary block diagram representation of Registration architecture (700), in accordance with an embodiment of the present disclosure.

In an exemplary embodiment, real Time Communication with Registration Portal via Socket Communication may occur between ML→Backend→Frontend to provide real-time status updates and instructions. The Registration happens via RTSP stream but not limited to it, performing different checks as mentioned above. Socket communication may be used to maintain real time communication with the front-end operator to provide live registration updates and directive to registering users. In an exemplary embodiment, the communication may be broken up into various stages:

Image capture stage
Similarity check stage
Duplication check stage
Inserted Data to DB
Return appropriate message on completion of Registration FIG. 7 illustrates exemplary block diagram representation of Registration architecture, in accordance with an embodiment of the present disclosure. The registration architecture (700) may include a One-click onboarding module (722). After configuring a new registration booth, it is onboarded and functional by just a click on the frontend (332). The whole pipeline gets initialized on a cloud native environment and camera gets connected with Registration pipeline (702) equipped with an artificial intelligence (AI) engine within minutes.

The registration architecture (700) may further include a Lightweight Scaling Architecture where cloud resources are only utilized when host starts the registration. As soon as registration is done system relinquishes the resources making it economical. This leads to on-demand resources utilization.

Figure 8:
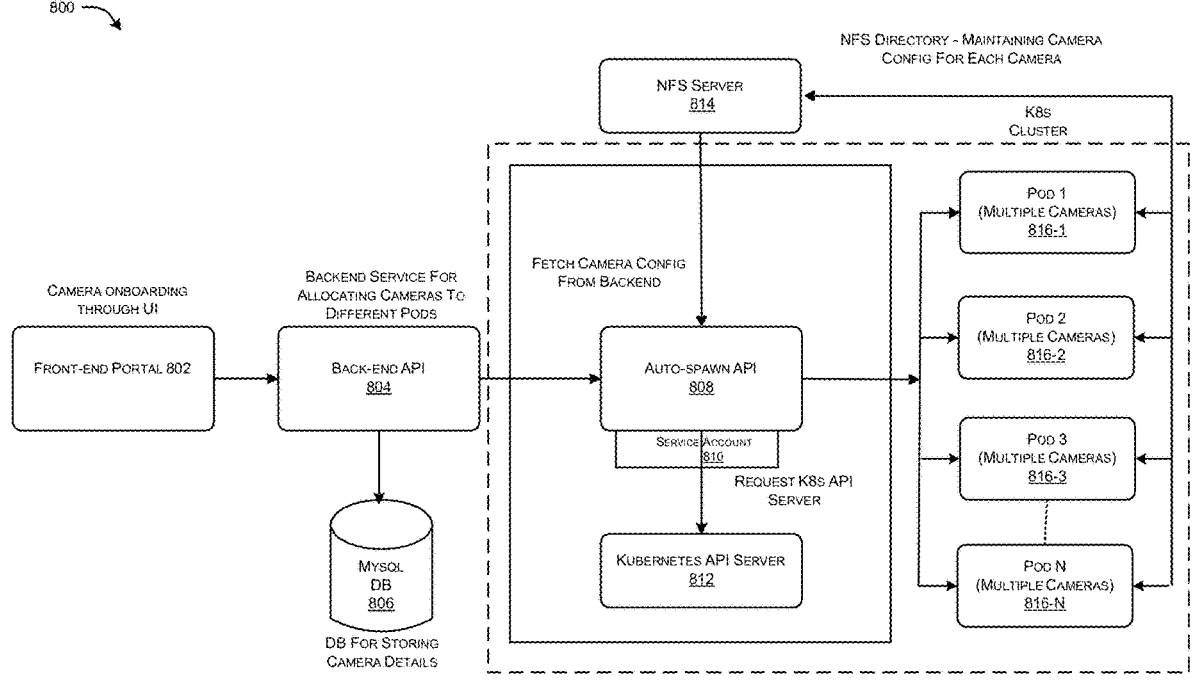
FIG. 8 illustrates an exemplary block diagram representation of a Face auto-spawn API architecture (800), in accordance with an embodiment of the present disclosure.

FIG. 8 illustrates an exemplary block diagram representation of a Face auto-spawn API architecture, in accordance with an embodiment of the present disclosure. As illustrated, in an embodiment, the Face auto-spawn API architecture (800) may be used for automatically spawning/deleting/editing custom ML pods (816-1, 816-2, 816-3, 816-4 inside the cluster. Multiple cameras (processes) can be added in a single pod; thus resources (GPU) are efficiently utilized.

In an exemplary embodiment, the user adds the required camera details through the face portal (802). The details are then sent to the face-backend API (804). The backend service then sends a request to the face auto-spawn API (808) for spawning a pod for the onboarded camera. The API also handles camera edit/delete requests. Multiple cameras can be added in a single pod; thus, resources are efficiently utilized. In this way, cameras can be easily onboarded with a single click.

Figure 9:
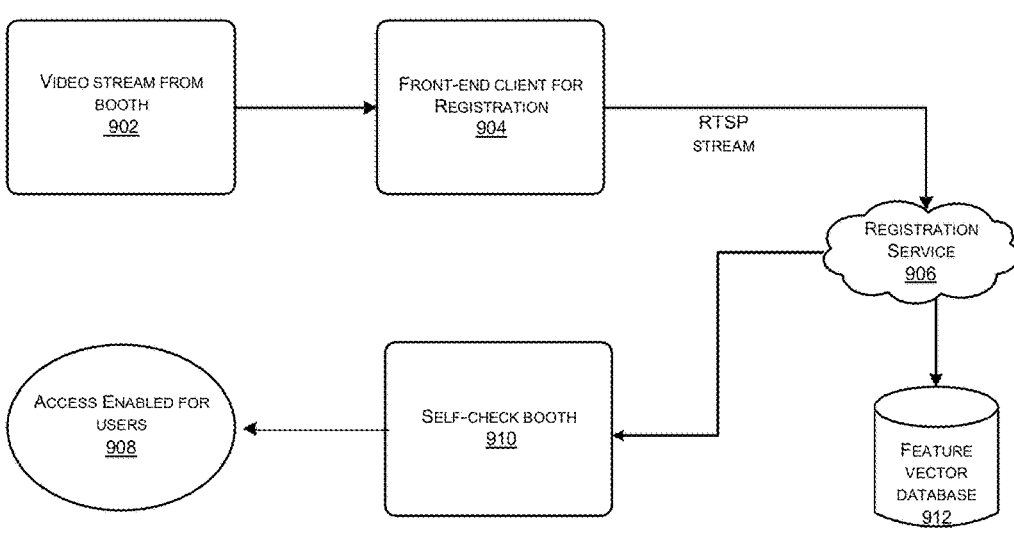
FIG. 9 illustrates an exemplary flow diagram representation of registration Flow (900), in accordance with an embodiment of the present disclosure.

FIG. 9 illustrates an exemplary flow diagram representation of registration Flow, in accordance with an embodiment of the present disclosure. As illustrated, in an embodiment, a video stream is received from a booth (902) which is sent to a front-end client registration (904). The RTSP stream is sent to a registration service module (906) where self-check booth (908) may provide access to users (910). The registration details may be then stored in a feature vector database (912). As the registration process takes around a minute. Live updates are provided during the process.

Figure 10:
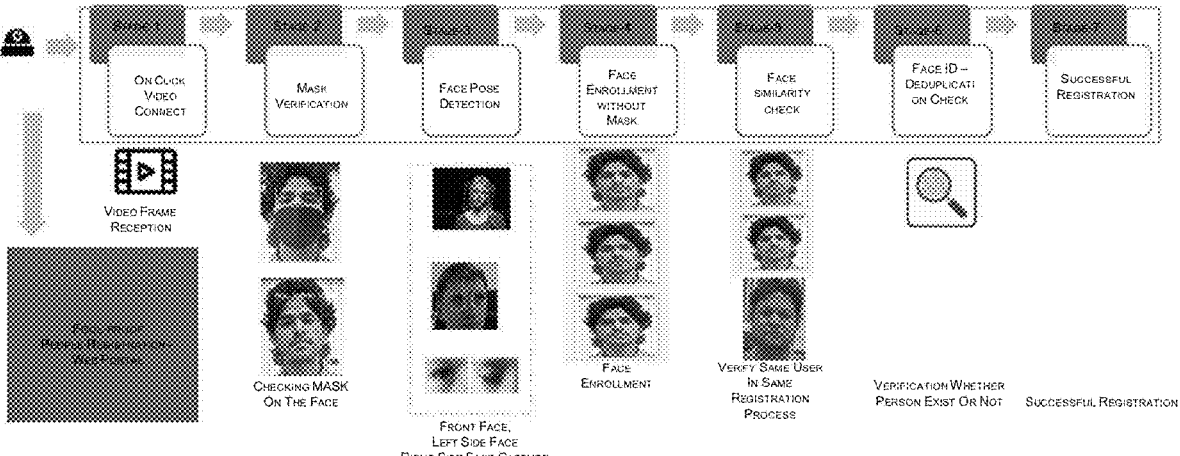
FIG. 10 illustrates an exemplary flow diagram representation of registration steps (1000), in accordance with an embodiment of the present disclosure.

FIG. 10 illustrates an exemplary flow diagram representation of registration steps, with reference to FIG. 9. The following Table 1 highlights the steps further:

TABLE 1

| Steps | Functions |
|---|---|
| 1 | Request received |
| 2 | Mask verification |
| 3 | Face Pose Detection - Frontal capture completed! Left capture started, please turn your head ~15 degrees towards the left and hold. |
|  | Left capture completed! Right capture started, please turn your head ~15 degrees towards the right and hold. |
|  | Right capture completed! Generating face records |
| 4 | Similarity check |
| 5 | Deduplication check |
| 6 | Inserting full face records |
| 7 | Face registration successful |

In an aspect, a self-registration booth for registering one or more entities is disclosed. The booth may include at least one image capturing device, a light source, a microphone, a speaker being operatively coupled with a processor. In an embodiment, the processor may be configured to capture an image of an entity and grant an access to the entity within a pre-defined location based on a positive verification of the entity with pre-stored data at a centralized server accessible by an Edge box.

Figure 11:
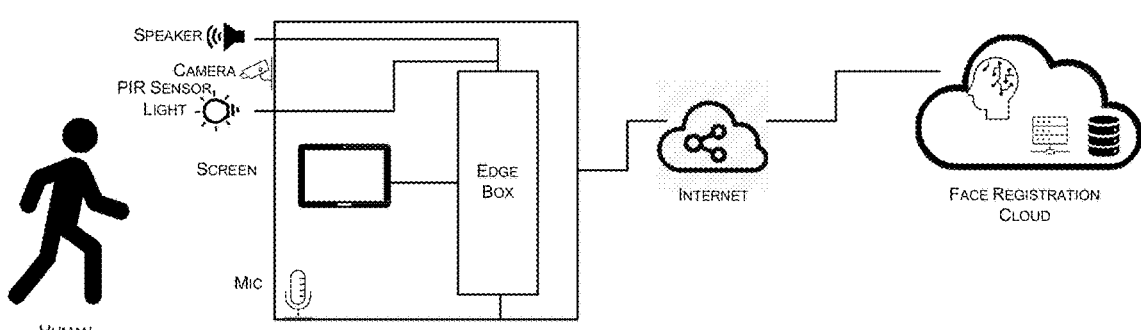
FIG. 11 illustrates an exemplary Self Registration Kiosk (1100), in accordance with an embodiment of the present disclosure.

FIG. 11 illustrates an exemplary Self Registration Kiosk, in accordance with an embodiment of the present disclosure. The self-registration Kiosk (1100) may include a Low-Cost FR Booth but not limited to the like. Any standard CCTV Camera gets converted into smart FR Registration Terminal where authorized host performs the people registration to capture the biometrics of the face. The system may perform un-maned self-service people registration via the Intelligent Kiosk (900). The intelligent Kiosk may be a Smart Self-Service Touchless Face Registration Kiosk but not limited to it.

In an exemplary embodiment, as soon as a user reaches towards the Smart Face Registration Kiosk/Booth, following activities happens Human Detection, Automatic Lights get turned on to have enough illustrations
Voice command—Welcoming the person
Asking to Choose the Organization
Asking to speak out the unique ID within Organization e.g., Employee ID After Validating the ID, person gets the OTP (One Time Password) on the Mobile to validate himself After Entering the OTP, User is asked via voice command to look into the Camera The user is asked to look left side to capture the left profile of the face User is asked to look right side to capture the right profile of the face Now System performs all necessary checks like dedupli-cation, all faces are similar, Blacklisted or not Then the system presents the captured photos to the user asked him to verify and confirm. If the user is not satisfied with image quality, he can re-perform his registration pro-cess again.

After the successful confirmation, User gets on-boarded into FR System and user gets confirmation on his mobile as SMS that the registration is done successfully.

Figure 12:
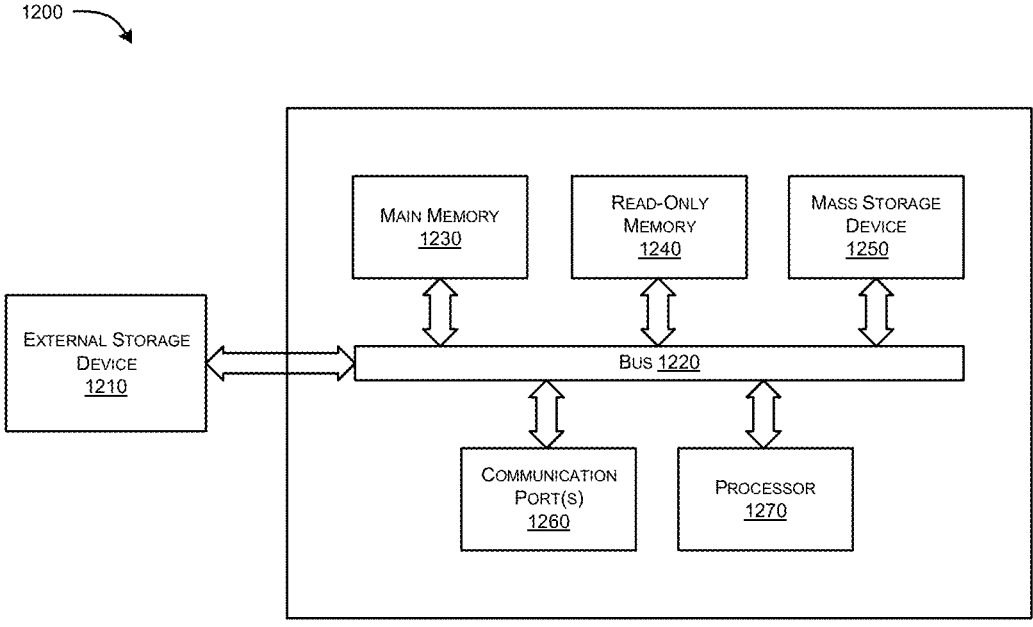
FIG. 12 illustrates an exemplary computer system in which or with which embodiments of the present invention can be utilized in accordance with embodiments of the present disclosure.

FIG. 12 illustrates an exemplary computer system in which or with which embodiments of the present invention can be utilized in accordance with embodiments of the present disclosure. As shown in FIG. 12, computer system 1200 can include an external storage device 1210, a bus 1220, a main memory 1230, a read only memory 1240, a mass storage device 1250, communication port 1260, and a processor 1270. A person skilled in the art will appreciate that the computer system may include more than one pro-cessor and communication ports. Processor 12120 may include various modules associated with embodiments of the present invention. Communication port 1260 can be any of an RS-232 port for use with a modem based dialup connec-tion, a 10/100 Ethernet port, a Gigabit or 10 Gigabit port using copper or fiber, a serial port, a parallel port, or other existing or future ports. Communication port 1260 may be chosen depending on a network, such a Local Area Network (LAN), Wide Area Network (WAN), or any network to which computer system connects. Memory 1230 can be Random Access Memory (RAM), or any other dynamic storage device commonly known in the art. Read-only memory 1240 can be any static storage device(s). Mass storage 1250 may be any current or future mass storage solution, which can be used to store information and/or instructions.

Bus 1220 communicatively couples processor(s) 1270 with the other memory, storage and communication blocks.

Optionally, operator and administrative interfaces, e.g. a display, keyboard, and a cursor control device, may also be coupled to bus 1220 to support direct operator interaction with a computer system. Other operator and administrative interfaces can be provided through network connections connected through communication port 1260. Components described above are meant only to exemplify various pos-sibilities. In no way should the aforementioned exemplary computer system limit the scope of the present disclosure.

Thus, the present disclosure provides a unique and inven-tive solution for recognition and registration of users.

While considerable emphasis has been placed herein on the preferred embodiments, it will be appreciated that many embodiments can be made and that many changes can be made in the preferred embodiments without departing from the principles of the invention. These and other changes in the preferred embodiments of the invention will be apparent to those skilled in the art from the disclosure herein, whereby it is to be distinctly understood that the foregoing descriptive matter to be implemented merely as illustrative of the invention and not as limitation.

A portion of the disclosure of this patent document contains material which is subject to intellectual property rights such as, but are not limited to, copyright, design, trademark, IC layout design, and/or trade dress protection, belonging to Jio Platforms Limited (JPL) or its affiliates (herein after referred as owner). The owner has no objection to the facsimile reproduction by anyone of the patent docu-ment or the patent disclosure, as it appears in the Patent and Trademark Office patent files or records, but otherwise reserves all rights whatsoever. All rights to such intellectual property are fully reserved by the owner.

We claim:

1. A fool-proof registration system, said system compris-ing a centralized server coupled with a processor over a network, said processor being operatively configured with a memory storing instructions that on execution enable the processor to:

establish a communicative coupling between a computing device of the entity and the centralized server;

receive a first set of data packets associated with the entity measured by one or more sensors operatively coupled with the processor;

extract one or more biometric features of the entity from the received first set of data packets;

retrieve from the centralized server a second set of data packets responsive to receipt of the first set of data packets;

compare the extracted biometric features of the entity with the retrieved second set of data packets;

identify an identity of a user upon positive match of the extracted one or more biometric features of the entity and the second set of data packets, wherein said second set of data packets pertain to biometric feature metadata and a user device metadata of a user device associated with a pre-existing user profile, said user-profile being stored on a centralized database;

map, using a machine learning (ML) engine, the identified user with a knowledgebase, wherein said ML engine processes the identified user to predict, from a plurality of service, an information service associated with said identified user, and facilitate an auto-response to said identified user corresponding to the information service based on a trained model, said auto-response being facilitated based on a pre-defined visual response from an operator or said identified user through an interface of said system; and register, the entity as a new user upon the centralized server upon a negative match of the extracted one or more biometric features of the entity and the second set of data packets.

2. The system as claimed in claim 1, wherein on a first communicative coupling of the user device with the cen-tralized server, the user profile corresponding to the user is generated by the centralized server based on user biometric feature metadata and the user device metadata based on one or more parameters input by the user.

3. The system as claimed in claim 1, wherein the user biometric features are recorded and stored onto the central-ized server for comparing with the received first set of data packets and identification of the entity with the correspond-ing pre-stored user.

4. The system as claimed in claim 1, wherein the one or more sensors that generate the first set of data packets are any or a combination of a image capturing sensor, a bio-metric capturing sensor, a fingerprint sensor, an iris recog-nition sensor, a speech recognition sensor, a gesture recog-nition sensor, a scanner.

5. The system as claimed in claim 1, wherein the first set of data packets is a set of images including multiple view-profiles such as left, right, front and back of the entity.

6. The system as claimed in claim 1, wherein extraction of the biometric features of the entity further includes any or a combination of face detection, mask/face accessory detection, head pose estimation, roll angle, gaze detection.

7. The system as claimed in claim 1, wherein the first set of data packets is a video-stream captured by a camera.

8. The system as claimed in claim 1, wherein a plurality of cameras for capturing images are onboarded and communicatively coupled with a network file sharing server, said network file sharing server storing camera orientation information to enable capturing multiple view-profiles of the entity selected from any or a combination of left, right, front and back of the entity.

9. The system as claimed in claim 1, wherein the processor is further configured to:

identify the entity as the user based on matching computing device metadata with the pre-stored user device metadata.

10. A method for fool-proof registration and identification comprising:

receiving by a data acquisition engine, a first set of data packets associated with an entity, said first set of data packets being measured by one or more sensors operatively coupled with a processor;

extracting by a feature extraction engine, one or more biometric features of the entity from the received first set of data packets;

retrieving from the centralized server a second set of data packets responsive to receipt of the first set of data packets;

comparing the extracted biometric features of the entity with the retrieved second set of data packets; and identifying upon positive match of the extracted one or more biometric features of the entity and the second set of data packets an identity of a user, wherein said second set of data packets pertain to biometric feature metadata and a user device metadata of a user device associated with a pre-existing user profile, said user-profile being stored on a centralized database;

mapping, using a machine learning (ML) engine, the identified user with a knowledgebase, wherein said ML engine processes the identified user to predict, from a plurality of service, an information service associated with said identified user, and facilitate an auto-response corresponding to the information service based on a trained model, said auto-response being facilitated based on a pre-defined visual response from an operator or said identified user through an interface of said system.

11. The method as claimed in claim 10, further comprising:

conducting a duplication check based on the extracted one or more biometric features of the entity and the second set of data packets.

12. The method as claimed in claim 10, wherein receiving the first set of data packets includes:

inputting—by an image capturing device, a plurality of images of the entity;

detecting by the machine learning (ML) engine a face of the entity;

checking by the ML engine, a dimension of the captured image with reference to a pre-defined threshold image size;

detecting a mask upon the face within the captured image of the entity; and estimating a head pose of the entity based on the captured images.

\* \* \* \* \*